US008023974B1

(12) United States Patent
Diao et al.

(10) Patent No.: US 8,023,974 B1
(45) Date of Patent: Sep. 20, 2011

(54) LIGHTWEIGHT SVM-BASED CONTENT FILTERING SYSTEM FOR MOBILE PHONES

(75) Inventors: Lili Diao, Nanjing (CN); Vincent Chan, Nanjing (CN); Patrick MG Lu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 903 days.

(21) Appl. No.: 11/706,539

(22) Filed: Feb. 15, 2007

(51) Int. Cl.
*H04W 4/00* (2009.01)
(52) U.S. Cl. .......... 455/466; 709/206; 709/200; 706/52
(58) Field of Classification Search .................. 709/206
See application file for complete search history.

(56) References Cited

U.S. PATENT DOCUMENTS

| | | |
|---|---|---|
| 5,442,699 A | 8/1995 | Arnold et al. |
| 5,452,442 A | 9/1995 | Kephart |
| 5,640,492 A | 6/1997 | Cortes et al. |
| 5,649,068 A | 7/1997 | Boser et al. |
| 5,907,834 A | 5/1999 | Kephart et al. |
| 6,161,130 A | 12/2000 | Horvitz et al. |
| 6,192,512 B1 | 2/2001 | Chess |
| 6,279,128 B1 | 8/2001 | Arnold et al. |
| 6,622,134 B1 | 9/2003 | Sorkin |
| 6,650,890 B1 | 11/2003 | Irlam et al. |
| 6,711,583 B2 | 3/2004 | Chess et al. |
| 6,732,157 B1 | 5/2004 | Gordon et al. |
| 6,789,200 B1 | 9/2004 | Fiveash et al. |
| 6,813,712 B1 | 11/2004 | Luke |
| 2004/0002932 A1* | 1/2004 | Horvitz et al. ............ 706/46 |
| 2004/0148330 A1* | 7/2004 | Alspector et al. ........... 709/200 |
| 2005/0192992 A1* | 9/2005 | Reed et al. .................. 707/101 |
| 2005/0286522 A1* | 12/2005 | Paddon et al. ............. 370/389 |
| 2006/0149821 A1* | 7/2006 | Rajan et al. ................ 709/206 |
| 2007/0022075 A1* | 1/2007 | Horvitz et al. ............. 706/52 |
| 2008/0153513 A1* | 6/2008 | Flake et al. ............... 455/456.3 |

FOREIGN PATENT DOCUMENTS

| | | |
|---|---|---|
| EP | 1 377 892 B1 | 9/2004 |
| WO | WO 02/084459 A1 | 10/2002 |

OTHER PUBLICATIONS

Spam Assassin 2.64, Aug. 2004, 4 sheets. Webpage [online] [retrieved on Sep. 7, 2004]. Retrieved from the internet: http://www.spamassasin.apache.org.html>.

(Continued)

*Primary Examiner* — Nick Corsaro
*Assistant Examiner* — Gerald Johnson
(74) *Attorney, Agent, or Firm* — Okamoto & Benedicto LLP

(57) ABSTRACT

In one embodiment, a content filtering system generates a support vector machine (SVM) learning model in a server computer and provides the SVM learning model to a mobile phone for use in classifying text messages. The SVM learning model may be generated in the server computer by training a support vector machine with sample text messages that include spam and legitimate text messages. A resulting intermediate SVM learning model from the support vector machine may include a threshold value, support vectors and alpha values. The SVM learning model in the mobile phone may include the threshold value, the features, and the weights of the features. An incoming text message may be parsed for the features. The weights of features found in the incoming text message may be added and compared to the threshold value to determine whether or not the incoming text message is spam.

14 Claims, 3 Drawing Sheets

OTHER PUBLICATIONS

The Formulation of Support Vector Machine, 1998, 2 sheets [retrieved on Jul. 21, 2004]. Retrieved from the internet: http://www.mi-eng.cam.ac.uk/kkc21/main/node8.html>.

New Advance Anti-Spam Service, "Aladdin Knowledge Systems Launches New Advanced Anti-Spam Service" Jun. 26, 2003, 3 sheets. Webpage [online] [retrieved on Jul. 21, 2004]. Retrieved from the internet: http://www.ealladin.com/new/2003/esafe/anti-spam.asp.html>.

SVM-Light Support Vector Machine 6.01, Feb. 2004, 14 sheets. Webpage [online][retrieved on Sep. 9, 2004]. Retrived from the internet: http://www.cs.cornell.edu/People/tj/svm_light/html>.

Steve Ramsay's Guide to Regular Expressions, Electronic Text Center, University of Virginia, 12 sheets [retrieved on Sep. 2, 2004]. Retrieved from the internet: http://www.etext.lib.virginia.edu/helpsheets/regex.html>.

Dik L. Lee, et al. "Document Ranking and the Vector-Space Model", Mar./Apr. 1997, pp. 67-75, Hong Kong University of Science & Technology, Dept. of Computer Science, Hong Kong.

Support Vector Machines (SVM), 1984-2004 StatSoft, Inc., 5 sheets, webpage [online] [retrieved on Feb. 8, 2007]. Retrieved from the internet: http://www.statsoft.com/textbook/stsvm.html.

SVM—Support Vector Machines, DTREG, 15 sheets, webpage [online] [retrieved on Feb. 8, 2007]. Retrieved from the internet: http://wvvw.dtreg.com/svm.htm.

\* cited by examiner

LIGHTWEIGHT SVM-BASED CONTENT FILTERING SYSTEM FOR MOBILE PHONES

BACKGROUND OF THE INVENTION

1. Field of the Invention

The present invention relates generally to content filtering systems, and more particularly but not exclusively to content filtering systems operable on mobile phones.

2. Description of the Background Art

Mobile wireless devices facilitate communication between individuals, and dissemination of information in general. Some mobile wireless devices, such as mobile phones, even have the capability to receive not just voice communications but text messages as well. Text messaging has become very popular because of its relatively low cost of operation and convenience. As a result, mobile phones that are operable to receive Short Message Service (SMS) text messages are widely commercially available.

Malicious individuals, such as fraudsters, hackers, and spammers, are quick to take advantage of the anonymity and fast communication provided by wireless telephone networks. Just like on the Internet, these malicious individuals may send phony messages to advance fraudulent schemes (commonly known as "phishing"), unsolicited messages (commonly known as "spam"), and other malicious messages.

Content filtering systems for combating malicious messages in general purpose computers, such as desktop computers and servers, are commercially available from several anti-virus vendors. These content filtering systems, however, are generally too big and resource intensive for use in mobile phones. While mobile phones have become popular, they are still resource limited compared to general purpose computers. More particularly, most mobile phones have limited amounts of main memory (e.g., less than 1 MB), have relatively small file systems, and have slower CPU, which may or may not have floating point capability.

SUMMARY

In one embodiment, a content filtering system generates a support vector machine (SVM) learning model in a server computer and provides the SVM learning model to a mobile phone for use in classifying text messages. The SVM learning model may be generated in the server computer by training a support vector machine with sample text messages that include spam and legitimate text messages. A resulting intermediate SVM learning model from the support vector machine training process may include a threshold value, support vectors, and alpha values. The SVM learning model in the mobile phone may include the threshold value, the features, and the weights of the features. An incoming text message may be parsed for the features. The weights of features found in the incoming text message may be added and compared to the threshold value to determine whether or not the incoming text message is spam.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Components may be implemented separately in multiple modules or together in a single module.

Embodiments of the present invention pertain to a lightweight content filtering system. The content filtering system is lightweight in that it is designed to operate on devices that have limited resources. That is, the lightweight content filtering system does not require as much computational resources as a conventional content filtering system running in a relatively powerful computer. As such, embodiments of the present invention are described in the context of mobile phones. It should be understood, however, that the present invention may also be adapted for use in similar resource limited devices or in similar non-resource limited devices requiring high-performance.

The present disclosure pertains to content filtering, particularly to anti-spam applications. Techniques for combating spam are also disclosed in U.S. application Ser. No. 11/483,073, filed on Jul. 7, 2006 and in U.S. application Ser. No. 10/959,365, filed on Oct. 6, 2004, both of which are assigned to the assignee of the present disclosure.

Figure 1:
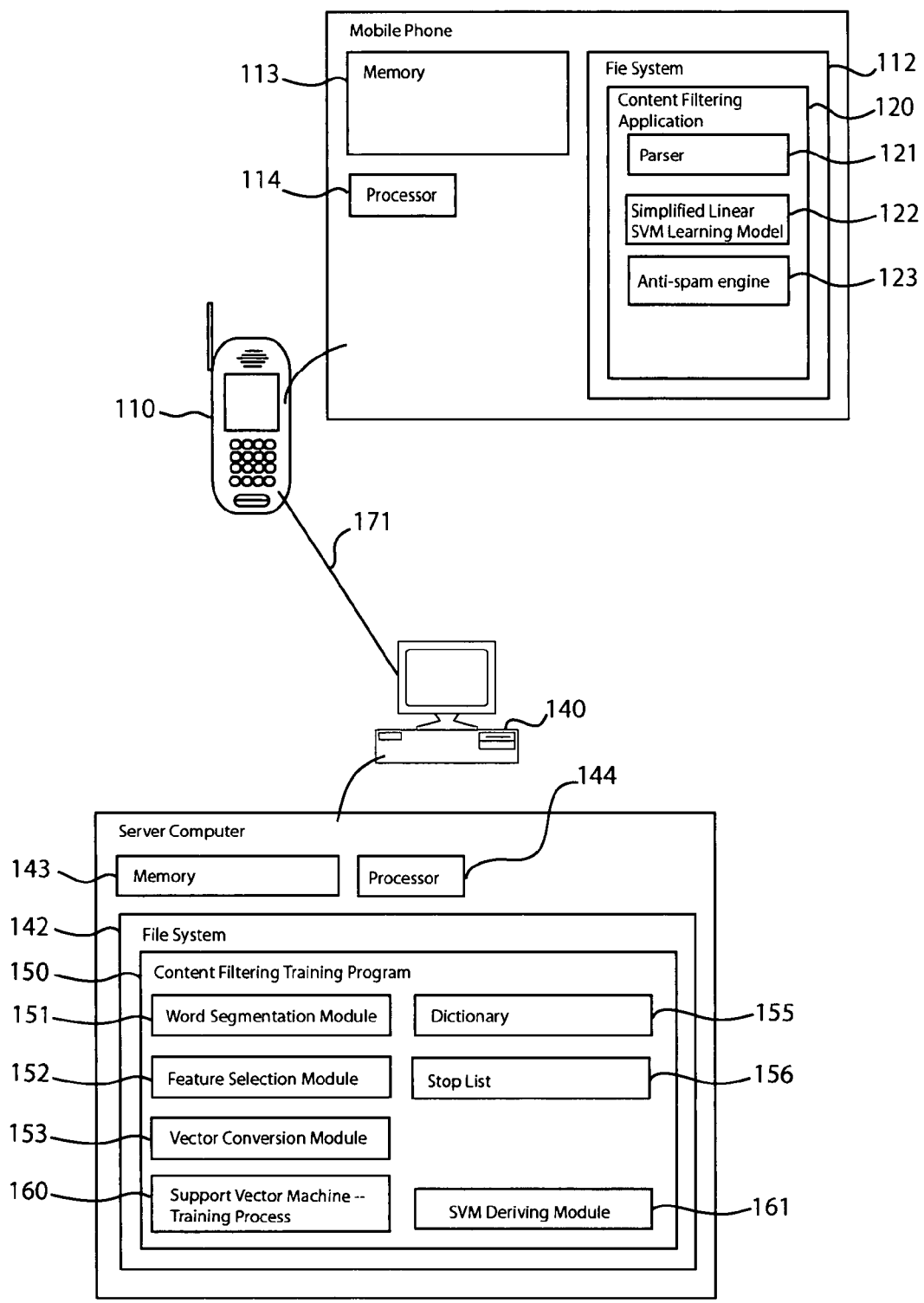
FIG. 1 shows a mobile phone and a server computer in accordance with an embodiment of the present invention.

Referring now to FIG. 1, there is shown a mobile phone 110 and a server computer 140 in accordance with an embodiment of the present invention. The content filtering training program 150 in the server computer 140 and the content filtering application 120 in the mobile phone 110 together form a content filtering system. As will be more apparent below, the server computer 140 employs advanced machine learning to build an intermediate learning model during a training stage. A simplified, lightweight learning model derived from the intermediate learning model is used in the mobile phone 110 to detect spam during an application stage.

In the example of FIG. 1, the mobile phone 110 comprises a main memory 113 (e.g., random access memory), a processor 114, and a file system 112. The file system 112 may comprise non-volatile storage (e.g., hard disk, flash) for files and other data units. In the example of FIG. 1, the file system 112 includes the content filtering application 120, which in turn comprises a parser 121, a simplified linear kernel support vector machine (SVM) learning model 122, and an anti-spam engine 123. In the example of FIG. 1, the content filtering application 120 is configured for anti-spam. As can be appreciated in light of the present disclosure, the content filtering application 120 may also be adapted for other content filtering applications without detracting from the merits of the present invention.

One or more components of the content filtering application 120 may be loaded onto the main memory 113 for execution or processing by the processor 114. The content filtering application 120 comprises a lightweight application configured to operate in a resource limited environment, such as the mobile phone 110. Other components of the mobile phone 110 are not shown for clarity of illustration. For example, the mobile phone 110 may include additional components found in conventional mobile phones, such as wireless communication modules etc.

The parser 121 may comprise computer-readable program code for parsing an incoming text message to extract features from the text message. In one embodiment, the parser 121 parses a text message for features indicated in the learning model 122. A feature, in the context of content filtering in general, may comprise words or phrases indicative of different characteristics among different classes of text messages. In the example of FIG. 1, a feature may be a word or a phrase indicative of spam (i.e., unsolicited or unwanted text message) or normal (i.e., legitimate) messages, which to some extent are measured by corresponding importance values. The parser 121 may identify features in the text message, extract the identified features, and make the extracted features available to the anti-spam engine 123. Advantageously, in contrast to other content filtering applications, a text message does not necessarily have to be converted into a vector before the text message may be classified in the mobile phone 110. That is, the anti-spam engine 123 may use the extracted features directly with the learning model 122, even without having the extracted features converted into a vector format. This conserves computational resources of the mobile phone 110.

The simplified linear SVM learning model 122 may comprise a model for classifying a text message wirelessly received in the mobile phone 110. In one embodiment, the anti-spam engine 123 uses data in the learning model 122 to determine whether or not a text message is spam. As its name implies, in one embodiment, the learning model 122 was generated by training a support vector machine during the training stage. Unlike conventional SVM-based learning models, however, the learning model 122 does not necessarily need to include support vectors, thereby conserving storage and computational resources of the mobile phone 110. In one embodiment, the learning model 122 comprises a threshold value $b_0$, features, and weights of each feature, all of which are obtained and derived from an intermediate SVM learning model generated in the server computer 140 by training a support vector machine with sample text messages.

The anti-spam engine 123 may comprise computer-readable program code for determining whether or not a text message is spam. The anti-spam engine 123 may be configured to consult the learning model 122 to find the assigned weight for each feature extracted from the incoming text message and to get the threshold value generated by the support vector machine during the training stage. The anti-spam engine 123 may sum the weights of all of the extracted features and compare the sum to the threshold value. In one embodiment, the anti-spam engine 123 deems the text message spam if the sum exceeds the threshold value. Otherwise, the anti-spam engine 123 may deem the text message to be a normal (i.e., legitimate) message.

In the example of FIG. 1, the server computer 140 comprises a main memory 143 (e.g., random access memory), a processor 144, and a file system 142. The file system 142 may comprise non-volatile storage (e.g., hard disk, flash) for files and other data units. In the example of FIG. 1, the file system 142 includes the content filtering training program 150, which in turn comprises a word segmentation module 151, a feature selection module 152, a vector conversion module 153, a support vector machine 160, an SVM deriving module 161, a dictionary 155, and a stop list 156. The components of the content filtering training program 150 may be loaded onto the main memory 143 for execution or processing by the processor 144. Other components of the computer 140 are not shown for clarity of illustration. For example, the computer 140 may include additional components found in conventional servers and desktop computers.

The word segmentation module 151 may comprise computer-readable program code for parsing sample text messages for the presence of particular words or phrases listed in the dictionary 155. The dictionary 155 may include words or phrases typically found in different classes of text messages. In one embodiment, the dictionary 155 includes words or phrases typically included in a spam, such as "save now" or "special offer." The stop list 156, on the other hand, may include words or phrases that don't provide information regarding whether a text message is of a particular classification. The words or phrases in the stop list 156 are typically meaningless in terms of content filtering and may include adverbs and prepositions, for example. In one embodiment, the word segmentation module 151 parses sample text messages to identify words or phrases included in the dictionary 155, compiles the identified words or phrases in a list of identified words or phrases, and revises the list of identified words or phrases by removing those included in the stop list 156.

Depending on what language the text message is in, the word segmentation module 151 may have to first segment a sample text message into individual words or phrases before selecting features from these words or phrases. For example, a text message in the Chinese language may have to be segmented, while segmentation may not be necessary with text messages written in the English language since English words are always separated by spaces.

The feature selection module 152 may comprise computer-readable program code for determining the importance of a word or phrase in classifying a text message. In one embodiment, for each word or phrase in the dictionary 155 identified as being in a sample text message, the feature selection module 152 assigns an importance value indicative of the importance of that identified word or phrase in classifying text messages. The identified words or phrases may then be ranked in order of importance value, with the top ranking words or phrases being selected for content filtering. The words or phrases retained for content filtering are referred to as "features" or "feature words or phrases" and included in a feature list (see 221 in FIG. 2). In effect, the feature selection module 152 prunes the list of identified words or phrases to a smaller, more manageable list of features.

The vector conversion module 153 may comprise computer-readable program code for converting words or phrases parsed from sample text messages into a form suitable for processing by the support vector machine 160. In one embodiment, the conversion module 153 converts words or phrases from each sample text message into a vector that includes numeric representations of features.

The support vector machine 160 may comprise computer-readable program code for generating a learning model (also referred to as "intermediate learning model") from sample text messages. In one embodiment, the support vector machine 160 learns the characteristics of spam text messages using sample text messages and generates a learning model based on that learning. As will be more apparent below, the support vector machine 160 preferably uses a linear kernel function. The support vector machine 160 uses machine learning methods. Unlike simple keyword matching, signature matching, and other non-machine learning approaches, use of machine learning is not as easily defeated by spammers.

The support vector machine (SVM) deriving module 161 may comprise computer-readable program code for generating the learning model 122 used in the mobile phone 110. In one embodiment, the deriving module 161 derives the learning model 122 from the intermediate learning model generated by the support vector machine 160. The deriving module 161 may simplify the intermediate learning model to obtain features, weights of features, and a threshold value.

Generally speaking, machine learning pertains to intelligent algorithms for finding hidden knowledge in data. Machine learning approaches, such as Support Vector Machine (SVM), Neural Networks (NN), and decision trees, may be employed in classification or categorization applications. Machine learning may thus be employed to generate models for content filtering systems. Unfortunately, typical machine learning implementations are relatively complicated and unsuitable for use in mobile phones, where memory, storage, and computational resources are limited. For example, some mobile phones have less than 1 MB (usually several hundred KB) of main memory and cannot perform floating point computation. Some of these mobile phones have much lower computational speed and smaller file system volume than general purpose computers (e.g., personal computers). Therefore, conventional, relatively complicated machine learning approaches may not work well in certain mobile phones. As will be more apparent below, embodiments of the present invention employ a relatively complicated machine learning approach, such as SVM, without the associated storage and computational penalties. This advantageously allows for creation of an effective learning model that may be employed for anti-spam applications in resource-limited devices, such as mobile phones.

In one embodiment, content filtering in a mobile phone involves two stages namely, a training stage and an application stage. In the training stage, the content filtering system extracts knowledge from a large amount of training data, which in this embodiment is a plurality of sample text messages. Because the training stage may require relatively large amounts of main memory, file system volume, and computation, the training stage is preferably performed in a general purpose computer (e.g., server computer 140) rather than in the mobile phone (e.g., mobile phone 110).

In the application stage, knowledge learned during the training stage of the machine learning process is employed to make a prediction or judgment on new text messages received by the mobile phone (for example, for a received SMS text message, predict if it is legitimate or spam). Knowledge learned in the training stage is expressed in a relatively concise form that requires relatively simple computation so that it may be deployed in a resource limited device such as the mobile phone 110.

In the example of FIG. 1, the computer 140 may communicate with the mobile phone 110 over a link 171. The link 171 may be a wireless (e.g., Bluetooth interface, wireless telephone network, wireless computer network) or wired (e.g., serial or parallel bus, wired computer network) link. The learning model 122 may be generated in the computer 140 and then forwarded to the mobile phone 110. The content filtering application 120 may originally be stored in the computer 140 and provided to the mobile phone 110 over the link 171. Updates to components of the content filtering application 120 in the mobile phone 110 may be transmitted from the computer 140 to the mobile phone 110 also over the link 171. For example, the user of the mobile phone 110 may dial up to the computer 140 to receive the latest learning model 122. The content filtering application 120 may thus be sold as a product to mobile phone users.

The mathematical foundation of embodiments of the present invention is now explained. Generally speaking, SVM is a well known learning method that is based on statistical learning theory. It has gained popularity due to many attractive features and promising empirical performance in the fields of nonlinear and high dimensional pattern recognition.

In SVM, m distinctive features organized by serial numbers may be represented as $\{Feature\#1, Feature\#2, \ldots, Feature\#m\}^T$. These features (also referred to as "feature list" or "feature set") may form a feature space with each feature being a single dimension of that space. Therefore, the m features can be regarded mathematically as an m-dimensional feature space. For anti-spam applications, each of the features may represent a word or phrase indicative of spam or normal message.

Suppose there is a sample object (e.g., text message) to be observed and its vector representation $x=\{x^{(1)}, x^{(2)}, \ldots, x^{(k)}, \ldots, x^{(m)}\}^T$ comes from the aforementioned feature space $\aleph \subset R^m$, where m is the dimension of the vector or the number of features in the feature space, and k=1, 2, ..., m. In that case, any item in x represents the importance value of a feature in the same position (e.g., by serial number) among the feature set related with x. That is, for any k=1, 2, ..., m, $x^{(k)}$ is the weight of Feature#k in x. In general, $x^{(k)} \neq 0$ if Feature#k appears in the sample object; otherwise, $x^{(k)}=0$. Specifically, in a Boolean representation style, $x^{(k)}=1$ if Feature#k appears in the sample object; otherwise, $x^{(k)}=0$. In the following discussions, the vector of the sample, rather than the sample itself, may be referred to for ease of illustration.

Let $(x_1,y_1), \ldots, (x_N,y_N) \in \aleph \times \{-1,+1\}$ denote the vector representations of a training sample set of size N with such sample objects, where $y \in \{-1,+1\}$ is the class label. The class label may be positive (+1) for one class and negative (−1) for another class. In anti-spam applications, the positive class may represent spam, while the negative class may represent a legitimate message. A support vector machine first maps the original feature space to a high-dimensional linear space via a nonlinear mapping defined by a dot product function, and then finds a separating hyperplane, which is optimal and is decided by support vectors, in the new linear space. Consider an m-dimensional feature space $\hbar$, which is a subset of $IV^m$ and is spanned by a mapping $\phi$. In a support vector setting, any 0 may correspond to a Mercer kernel function $K(x,x')=(\phi(x) \cdot \phi(x'))$ implicitly computing the dot product in $\hbar$. The goal of support vector machines is to find some separating hyperplane described by a vector $\omega$ in feature space $\hbar$. Finding the hyperplane may be cast into a quadratic optimization problem:

$$\min_{\omega \in h} \frac{1}{2}\|\omega\|_2^2 \quad (EQ. 1)$$

$$\text{subject to } y_n(\omega \cdot \phi(x_n) + b) \geq 1 \ n = 1, \ldots, N$$

One selects the hyperplane with minimal VC capacity, which in this case can be achieved by maximizing the margin. Here, the margin $$\rho = \frac{2}{\|\omega\|_2}$$

is defined as the minimum $l_2$-distance of a training point to the separating hyperplane. Here, support vectors are the points $(x_i, y_i)$ that satisfy $y_n(\omega \cdot \phi(x_n)+b)=1$. Under K-T conditions, $\alpha=(\alpha_1, \alpha_2, \ldots, \alpha_N)$ (also referred to as "alpha values") can be optimized by maximizing a target function that is equivalent to the optimization problem of SVM:

$$W(\alpha) = \sum_{i=1}^{N} \alpha_i - \frac{1}{2} \sum_{i,j=1}^{N} \alpha_i \alpha_j y_i y_j K(x_i, x_j), \quad (EQ. 2)$$

Suppose $\alpha^* = (\alpha_1^*, \alpha_2^*, \ldots, \alpha_{|SV|}^*)$ (SV denotes the set of support vectors and |SV| is the number of support vectors) are the optimal alpha values. The goal of an SVM training process is to optimize alpha values to maximize $W(\alpha)$ of (EQ. 2). In the application stage as a final decision function of SVM, to predict the class label for an unknown object x, the decision rule of SVM can be redefined as:

$$f(x) = \text{sgn}\left(\sum_{x_i \in SV} y_i \alpha_i^* \cdot K(x_i \cdot x) - b_0\right) \quad (EQ. 3)$$

One way to compute $b_0$ is:

$$b_0 = \frac{1}{2}\left[\left\{\sum_{i=1}^{N} \alpha_i^* y_i x_i^{(k)}\right\}_k \cdot x^*(+1) + \left\{\sum_{i=1}^{N} \alpha_i^* y_i x_i^{(k)}\right\}_k \cdot x^*(-1)\right] \quad (EQ. 4)$$

where $k=1, 2, \ldots, m$, $(x^*(+1), y^*(+1)) \in SV$ is any positive sample and $(x^*(-1), y^*(-1)) \in SV$ is any negative sample.

Standard output of an SVM training process comprises optimal alpha values $\alpha^*$, threshold value $b_0$, and all support vectors SV. In the present disclosure, the just mentioned output data are also simply called as alpha values, threshold value, and support vectors, respectively. These output data generated by the SVM training process form the original SVM learning model, which is also referred to herein as the intermediate SVM model.

In one embodiment, to make the SVM algorithm efficient in generating learning models, the problem for iteratively finding optimal alpha values for equation 3 (EQ. 3) may be solved as follows:

1) Divide the vector $\alpha$ into two sets: the set B for free variables and the set N for fix variables.
2) In each round of iteration, solve a small quadratic programming for $\alpha_B$ and keep the variables in $\alpha_N$ unchanged.
3) Choose different $\alpha_B$ and $\alpha_N$ for each round of iteration. Once a small quadratic programming problem has been solved, the overall solution should get closer to the final solution.
4) Check the optimal conditions for the result from each round of iteration. The algorithm ends once the final solution has been found. Otherwise, step into a next round of iteration.

Other algorithms for searching for optimal alpha values may also be used without detracting from the merits of the present invention.

As can be appreciated, a kernel function $K(x,x')$ needs to be selected as part of using a support vector machine to generate a learning model. The kernel function is used to map the original feature space to a high dimensional feature space where a hyperplane can be used to separate the classes in the new feature space. In general, there are four types of kernel functions that may be used with different representation capabilities of the SVM learning problem:

1) Linear Kernel Function: $K(x,x')=x \cdot x'$ (i.e., a simple dot production between two vectors)
2) Gaussian Radial Basis Function: $K(x,x')=e^{-\|x-x'\|^2/2\sigma^s}$ ($\sigma$ is real value parameter to set)
3) Polynomial Kernel Function: $K(x,x')=(x \cdot x'+1)^p$ (p is real value parameter to set)
4) Sigmoid Kernel Function: $K(x,x')=\tan h(\kappa \cdot x \cdot x'-\delta)$ ($\kappa$ and $\delta$ are real value parameters to set)

In one embodiment, the support vector machine 160 employs a linear kernel function.

In the training stage, an SVM learning algorithm may be run in a server computer to conduct a learning process using samples of a first class (e.g., positive or spam) and a second class (e.g., negative or legitimate message). The result of the learning process is an SVM model file (i.e., the intermediate model file), which contains the value of $b_0$, the vector of $\alpha'^*$ ($\alpha'^* = \{\alpha_i'\}_i = \{y_i \cdot \alpha_i^*\}_i$ (i=1, 2, \ldots, |SV|)), and all support vectors (SV). In the SVM model file, $b_0$ is just a real value for thresholding, and $\alpha'^*$ is only a vector containing |SV| real values. Both $b_0$ and $\alpha'^*$ do not take much storage space because a real value normally just takes several bytes. However, the size of the resulting SVM model file is still relatively big because of the large number of training samples, and thus many support vectors, typically required to train a support vector machine. The large size of the SVM model file prevents conventional SVM-based anti-spam solutions from being used in mobile phones.

In one embodiment, a linear kernel function is used for SVM learning during the training stage to build the SVM learning model. Furthermore, in that embodiment, no support vectors are employed in the final decision function to classify incoming messages as spam or legitimate during the application stage. Under linear kernel cases, the values of $\alpha'^*$ and support vectors can be used to score features that establish the feature space to convert samples to vectors, and the final decision function can be transformed from a formula that measures the accumulated value of the weighted dot product values between the vector to be predicted and all support vectors in the model file to a formula that only measures the accumulated value of all of the features' scores appearing in the vector to be predicted. That is, for a linear kernel function, the final decision function of the SVM can be changed from the original form of $$f(x) = \text{sgn}\left(\sum_{x_i \in SV} y_i \alpha_i^* \cdot K(x_i \cdot x) - b_0\right) \quad \text{(EQ. 5)}$$

to $$f(x) = \text{sgn}\left(\sum_{x_i \in SV} y_i \alpha_i^* \cdot \sum_{x^{(k)} \neq 0, k=1,\ldots m} x^{(k)} x_i^{(k)} - b_0\right) \quad \text{(EQ. 6)}$$

$$= \text{sgn}\left(\sum_{x^{(k)} \neq 0, k=1,\ldots m} x^{(k)} \cdot \sum_{x_i \in SV} y_i \alpha_i^* x_i^{(k)} - b_0\right)$$

$$= \text{sgn}\left(\sum_{x^{(k)} \neq 0, k=1,\ldots m} x^{(k)} \cdot \sum_{x_i \in SV} \alpha_i'^* x_i^{(k)} - b_0\right)$$

Given $$\text{weight}(k) = \sum_{x_i \in SV} \alpha_i'^* x_i^{(k)} \quad \text{(EQ. 7)}$$

the value of weight(k) can be readily computed from the linear SVM model file based on all support vectors for each $k=1, 2, \ldots, m$, since each $\alpha_i'^*$ and $x_i^{(k)}$ are already known for every $x_i \in SV$. Therefore, we can derive the modified decision function of linear SVM as $$f(x) = \text{sgn}\left(\sum_{x^{(k)} \neq 0} \text{weight}(k) \cdot x^{(k)} - b_0\right) \quad \text{(EQ. 8)}$$

Here, if we choose the Boolean representation style for vector conversion, the decision function can be further simplified as $$f(x) = \text{sgn}\left(\sum_{x^{(k)} = 1} \text{weight}(k) - b_0\right) \quad \text{(EQ. 9)}$$

In the following embodiments, the simplified final decision function of EQ. 8 may be employed to make prediction for classification purposes using SVM models. That is, for any given unknown sample and its corresponding vector x converted according to an m-dimensional feature space, if $$\sum_{x^{(k)} = 1} \text{weight}(k) - b_0 > 0,$$

then x would be predicted as the positive class (+1), otherwise, x would be predicted as the negative class (−1). If weight(k) is considered as the score function of Feature#k, the decision function can be intuitively interpreted as, for a given sample object to be predicted, adding the score values of features appearing in the sample object. If the accumulated score value exceeds a threshold ($b_0$ value in this case), the sample object would be predicted as positive class; otherwise, the sample object would be predicted as negative class.

As can be appreciated from the foregoing, only the threshold $b_0$ and the value of the weight function of EQ. 7 for every feature are needed for the simplified final decision function of EQ. 9. Thus, in the application stage, the simplified linear SVM learning model 122 in the mobile phone 110 only needs the values of $b_0$ and weight(•) (see EQ. 7) to predict whether a text message is spam or legitimate. This allows for a relatively simple, lightweight SVM algorithm for use in anti-spam applications in mobile phones.

With the simplified final decision function, features with higher absolute score values would be more important in the final prediction. This advantageously allows for an option to reduce the feature set by discarding those features whose absolute scores are lower than a limit value, which may be a small positive value predefined and selected empirically. Furthermore, in the organization of the simplified SVM model file containing only $b_0$ and weight(•) values of features, separate feature and model files are not necessary. This is in marked contrast to conventional SVM approaches that require separate feature and model files. Instead, a single model file, such as learning model 122 of FIG. 1, can store all relevant information relating to the model and the features. The format of such a single model file for the simplified SVM model with linear kernels may be: $b_0$, {Feature#k,weight(k)}$_k$ ($k=1, 2, \ldots, m$ and m is the dimension of feature space), for example. Thus, all the features and their corresponding scores as well as the $b_0$ value may all be represented in a single learning model file.

The above described file format of a simplified SVM model file for linear kernel function is much smaller than traditional SVM model files because support vectors do not need to be included in the model file. The above described file format is even simpler than traditional simple, and less effective, machine learning approaches (e.g., SIM, Naive Bayes, etc.) because it only needs to maintain a single model file. In contrast, conventional machine learning approaches need to maintain a learning model file, a feature file containing all features and, in many cases, a dictionary file recording all possible tokens in the device where the content filtering application is run. These traditional content filtering systems are thus generally unsuitable for anti-spam applications in mobile phones.

Figure 2:
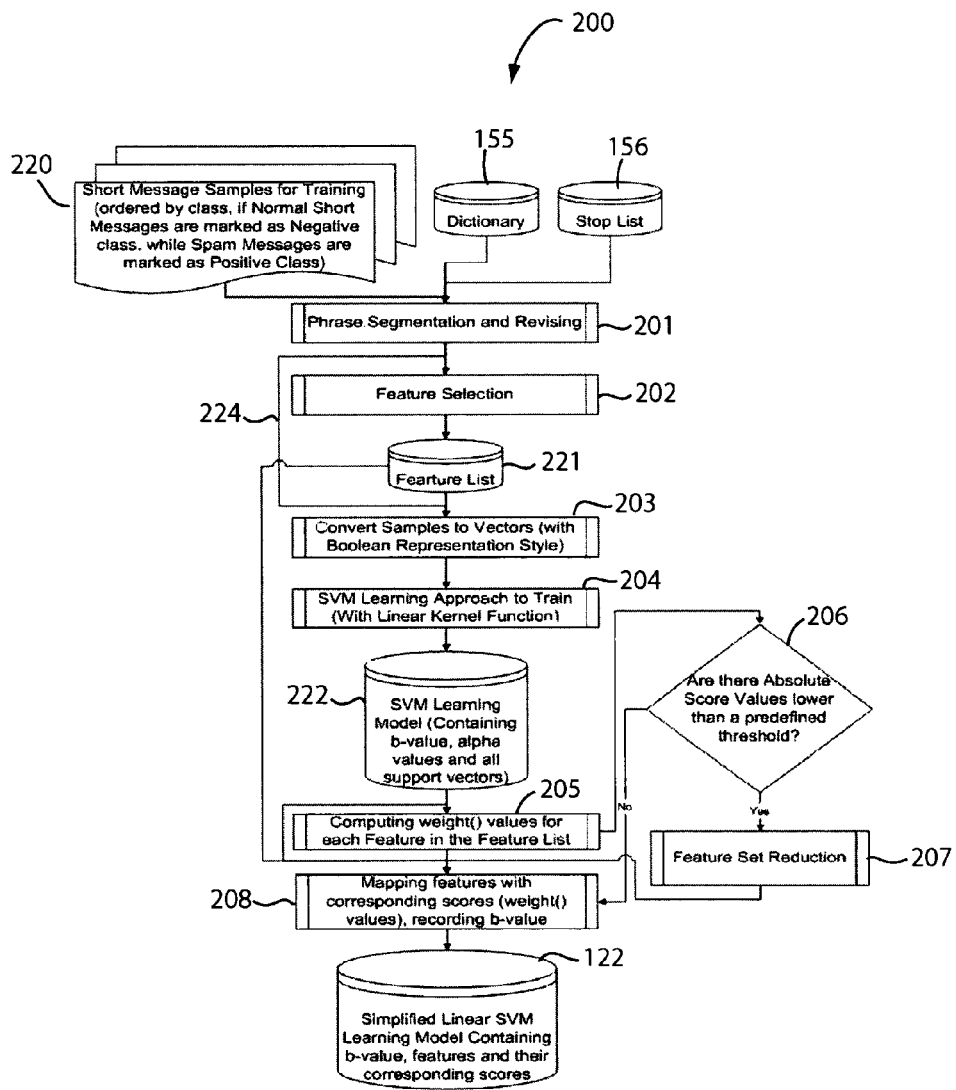
FIG. 2 shows a flow diagram of a method of generating a lightweight learning model in a server computer for classifying text messages in a mobile phone, in accordance with an embodiment of the present invention.

Referring now to FIG. 2, there is shown a flow diagram of a method 200 of generating a lightweight learning model in a server computer for classifying text messages in a mobile phone, in accordance with an embodiment of the present invention. In the example of FIG. 2, the lightweight learning model is used during the application stage to classify short message service (SMS) text messages that may be received in a mobile phone. The method 200 is explained using the components of the server computer 140 shown in FIG. 1. Other components may also be used without detracting from the merits of the present invention.

In one embodiment, the server computer 140 receives a plurality of training data in the form of samples of SMS text messages (see 220). The samples of text messages have been ordered by class. That is, the samples of text messages include a plurality of text messages that are known to be spam (positive class in this example) and a plurality of text messages that are known to be legitimate (negative class in this example). The training data may be used to train the content filtering system to distinguish between spam and legitimate messages. The content filtering system is also trained using the dictionary 155 and the stop list 156, both of which have been previously described with reference to FIG. 1.

For each class of text messages, the word segmentation module 151 parses the sample text messages to identify words or phrases included in the dictionary, compiles the identified words or phrases in a list of identified words or phrases, and revises the list of identified words or phrases by removing words or phrases listed in the stop list (step 201). At this point, the list of identified words or phrases includes words or phrases listed in the dictionary 155 but not in the stop list 156.

The feature selection module 152 may select from the list of identified words or phrases (from step 201) the more important words or phrases in identifying a particular class (step 202). For example, the feature selection module 152 may assign an importance value to each word or phrase in the list of identified words or phrases, rank the words or phrases in the list of identified words or phrases according to their respective importance values, and retain the top ranking words or phrases. The retained top ranking words or phrases may be saved in a feature list file 221. The retained top ranking words or phrases may be employed in the generation of the simplified linear SVM learning model 122 subsequently deployed in the mobile phone 110.

In one embodiment, the feature selection module 152 uses a cross-entropy method to select feature words or phrases from words or phrases parsed from the sample text messages. Cross-entropy, in general, is well known and is described by the equation:

$$CrossEntropy(t_k) = P(t_k) \sum_i P(C_i | t_k) \log \frac{P(C_i | t_k)}{P(C_i)} \qquad (EQ.\ 10)$$

In EQ. 10, $t_k$ is the k-th term (fundamental unit; a term being a word or phrase) in the original term space (i.e., the term space before feature selection, which is the list of identified words or phrases from step 201), where $k=1, 2, \ldots, n$ and n is the number of all possible terms in the original term space (which is the number of words or phrases in the list of identified words or phrases in our example). $P(t_k)$ is the occurrence probability of $t_k$; $C=\{C_1, C_2, \ldots, C_i, \ldots, C_S\}$ being a finite set of S classes, $i=1, 2, \ldots, S$. $P(C_i)$ means the occurrence probability of the i-th class, and $P(C_i|t_k)$ is the conditional probability of the occurrence of the i-th class for a given $t_k$. Feature selection approaches other than cross-entropy, such as information gain, may also be used.

In one embodiment, the feature selection module 152 computes the value (or importance value) of Expected Cross Entropy for each term $t_k$ in original term space, according to which the terms are ranked. With the volume limitation of feature sets or a threshold of the value of Expected Cross Entropy, the top terms in the ranking list (i.e., the top ranking words or phrases in the list of identified words or phrases) may be selected to establish the feature space (i.e., the feature list). With feature selection, the dimension of a vector for each text message may be advantageously represented by a much lower dimensionality to ease further computation, which is important in mobile phones.

Line 224 is included in FIG. 2 to indicate that, depending on implementation, the feature list generated during feature selection may be revised (e.g., remove inappropriate features or add new features) for fine tuning or optimization before the vector conversion process (see step 203).

For each sample text message in a particular class of text messages, the conversion module 153 creates a corresponding vector having features as fundamental units (step 203). For example, for a particular sample text message, the conversion module 153 may create a single vector for all features (from the feature list) occurring in the sample text message. Such a vector is also referred to as a "feature vector." In one embodiment, the conversion module 153 uses a Boolean process to convert a text message into a feature vector. For example, each item of a feature vector representing a text message may have a value of logical 1 or logical 0 depending on whether or not a corresponding feature appears in the text message.

The feature vectors are used to train the support vector machine 160 with linear kernel function to generate an intermediate SVM learning model 222 (step 204). The intermediate SVM learning model 222 includes the characteristics of positive and negative classes, which in this example are spam and legitimate messages, respectively. The intermediate SVM learning model 222 provides the threshold $b_0$ value (also referred to as "b-value"), $\alpha'^*$ (also referred to as "alpha values"), as well as all support vectors. The SVM deriving module 161 computes the weight(•) function values for each feature in the feature list to determine the importance of each feature in classifying a text message (step 205).

To further trim down the size of the resulting learning model 122 to be used in the mobile phone 110, features having a score (i.e., weight value) with an absolute value lower than a particular limit may be removed from the list of features to be considered in the mobile phone 110 (step 206 to step 207). That is, the feature set may be reduced by removing features that are insignificant in terms of their importance in classifying messages. The SVM deriving module 161 stores the remaining features, their scores, and the b-value from the support vector machine 160 as the simplified linear SVM learning model 122. The learning model 122 is subsequently provided to the mobile phone 110 for use during the application stage to predict whether or not an incoming text message is spam.

Figure 3:
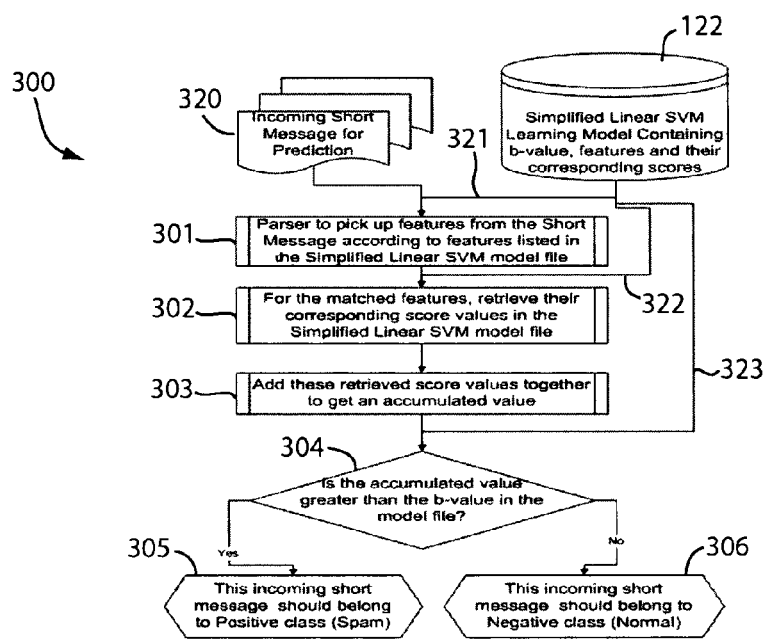
FIG. 3 shows a flow diagram of a method of classifying text messages wirelessly received in a mobile phone, in accordance with an embodiment of the present invention.

FIG. 3 shows a flow diagram of a method 300 of classifying text messages wirelessly received in a mobile phone, in accordance with an embodiment of the present invention. The method 300 is performed by the content filtering system in the application stage. FIG. 3 is explained using the components of the mobile phone 110 shown in FIG. 1. Other components may also be used without detracting from the merits of the present invention.

In the example of FIG. 3, the parser 121 parses an incoming SMS text message (see 320) for feature words or phrases listed in the simplified linear SVM learning model 122 (step 301). Line 321 in FIG. 3 indicates that the parser 121 consults the learning model 122 for features to look for. For example, the parser 121 may check the text message for words and phrases having corresponding score values (i.e., have weight values) in the learning model 122. The parser 121 may extract such features from the text message and make them available to the anti-spam engine 123. The anti-spam engine 123 may retrieve from the learning model 122 the score values of the extracted features (step 302). Line 322 in FIG. 3 indicates that the anti-spam engine 123 consults the learning model 122 for the weights of features found in the text message.

As can be appreciated, the learning model 122 is fairly compact even though it is based on support vector machine learning. In one embodiment, the model 122 only needs the b-value for use a spam threshold and the features with their corresponding weights to be used as score values. Separate feature list and dictionary files and support vectors, which are traditionally needed in an SVM-based learning model, are not necessarily needed. Further note that the extracted features of the text message may be employed to classify the text message without having to convert the extracted features to vectors in the mobile phone 110. These advantageously minimize storage requirements, I/O operation times for file access, and computation times, reducing the load imposed by the content filtering application 120 on the mobile phone 110.

The anti-spam engine 123 may add the score values of all the features extracted from the text message to generate a total score for the text message (step 303). If the total score exceeds the b-value, which is available from the learning model 122 as indicated by the line 323, the anti-spam engine 123 may deem the text message as spam (step 304 to step 305). Otherwise, the anti-spam engine may deem the text message as legitimate (step 304 to step 306).

As can be appreciated, the anti-spam engine 123 only needs to perform simple addition and compare operations on real values to determine whether or not a text message is spam. This advantageously requires relatively minimal processor time even when using a learning model generated using a support vector machine. In contrast, conventional approaches using support vector machines and other advanced machine learning algorithms are relatively computation intensive as they need to perform floating point computations. This makes the content filtering application 120 especially suitable for use in mobile phones.

A lightweight advanced learning method-based content filtering system for mobile phones and other resource limited devices have been disclosed. While specific embodiments of the present invention have been provided, it is to be understood that these embodiments are for illustration purposes and not limiting. Many additional embodiments will be apparent to persons of ordinary skill in the art reading this disclosure

What is claimed is:

1. A method of classifying text messages in a mobile phone, the method comprising:
   training a support vector machine using a plurality of sample spam text messages and a plurality of sample legitimate text messages in a server computer separate from the mobile phone during a training stage to generate an intermediate support vector machine learning model that includes a threshold value and support vectors;
   deriving the support vector machine (SVM) learning model from the intermediate support vector machine learning model by storing in the SVM learning model the threshold value but not the support vectors from the intermediate support vector machine learning model, a feature set, and score values comprising weights assigned to features in the feature set;
   providing the SVM learning model in the mobile phone,
   extracting features from a text message in the mobile phone to generated extracted features;
   retrieving from the SVM learning model a corresponding score value for each of the extracted features;
   adding score values of the extracted features to generate a total score; and
   comparing the total score to the threshold value to determine whether or not the text message is a spam text message.

2. The method of claim 1 wherein the SVM learning model is generated in the server computer during the training stage and wirelessly provided to the mobile phone.

3. The method of claim 1 wherein the extracted features are not converted to vectors in the mobile phone.

4. The method of claim 1 wherein the text message comprises a Short Message Service (SMS) text message.

5. A mobile phone comprising a memory, a processor configured to run computer-readable program code in the memory, and a file system, the file system comprising:
   a support vector machine (SVM) learning model comprising a threshold value, a feature set, and score values for features in the feature set, the SVM learning model being derived from an intermediate SVM learning model generated in a computer external to the mobile phone by training a support vector machine using a plurality of sample spam text messages and a plurality of sample legitimate text messages, the score values comprising weight values assigned to features in the feature set;
   a parser configured to parse a text message in the mobile phone for features noted in the SVM learning model; and
   an anti-spam engine configured to determine whether or not the text message is a spam text message based on weights of features noted in the SVM learning model and found in the text message without converting the text message to a vector in the mobile phone.

6. The mobile phone of claim 5 wherein the anti-spam engine determines whether or not the text message is a spam text message by retrieving from the SVM learning model a weight of each feature found in the text message, adding the weights of all features found in the text message to generate a total score, and comparing the total score to the threshold.

7. The mobile phone of claim 6 wherein the anti-spam engine is configured to deem the text message as a spam text message if the total score exceeds the threshold.

8. The mobile phone of claim 5 wherein the parser is configured to parse the text message by extracting from the text message words and/or phrases having corresponding weights in the SVM learning model.

9. A method of classifying text messages wirelessly received in a mobile phone, the method comprising:
   in a server computer, training a support vector machine using a plurality of sample text messages comprising sample spam text messages and sample legitimate text messages to generate a first support vector machine (SVM) learning model, the first SVM learning model comprising a threshold value, a feature set, and score values for features in the feature set;
   providing the first SVM learning model to a mobile phone; and
   using the first SVM learning model in the mobile phone to classify a text message in the mobile phone without converting the text message to a vector in the mobile phone.

10. The method of claim 9 wherein the first SVM learning model in the mobile phone does not include support vectors generated during the training of the support vector machine in the server computer.

11. The method of claim 9 wherein training the support vector machine in the server computer comprises:
   providing a dictionary and a stop list;
   parsing the plurality of sample text messages to identify words in the plurality of sample text messages included in the dictionary to generate a feature list;
   removing from the feature list words included in the stop list to generate a revised feature list;
   converting the plurality of sample text messages to feature vectors having features corresponding to words included in the revised feature list; and
   using the feature vectors to train the support vector machine to generate a second support vector machine (SVM) learning model, the support vector machine employing a linear kernel function, the second SVM learning model including a threshold value, a plurality of support vectors and a set of alpha values; and
   deriving the first SVM learning model from the second SVM learning model by including in the first SVM learning model the threshold value from the second SVM learning model, the revised feature list, and score values of features in the revised feature list computed by combining the alpha values and the support vectors in the second SVM learning model.

12. The method of claim 9 wherein using the first SVM learning model in the mobile phone to classify the text message comprises:

parsing the text message to extract features from the text message, the extracted features being identified in the first SVM learning model;

consulting the first SVM learning model for score values of the extracted features; and comparing the score values to the threshold included in the first SVM learning model.

13. The method of claim 12 wherein comparing the score values comprises:

adding the score values of the extracted features to generate a total score; and deeming the text message as a spam text message if the total score exceeds the threshold value.

14. The method of claim 9 wherein the text message comprises an SMS text message.

* * * * *